Patented Dec. 13, 1949

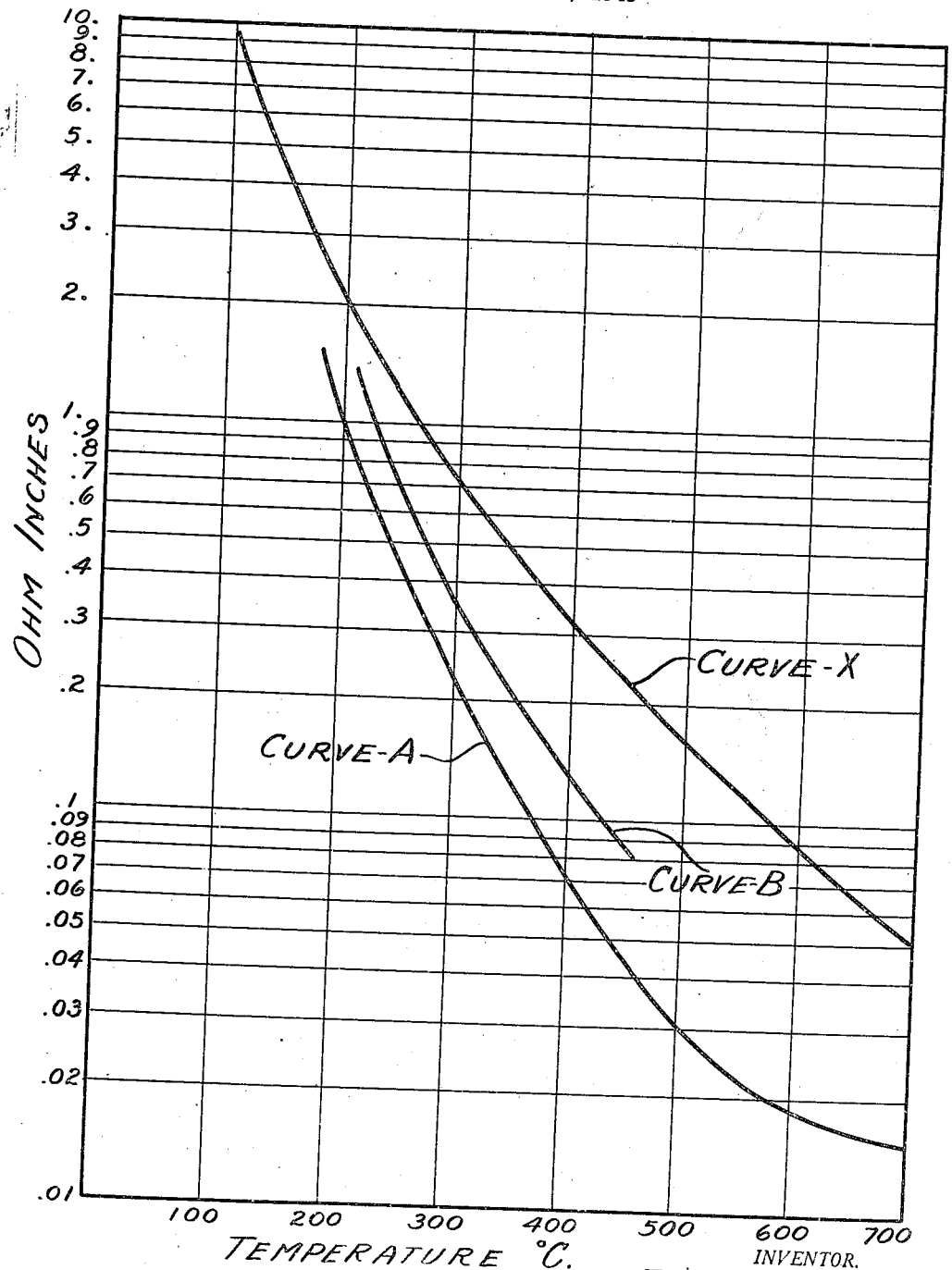

2,490,826

UNITED STATES PATENT OFFICE 2,490,826

ELECTRICALLY CONDUCTING REFRACTORY COMPOSITIONS

John M. Mochel, Louisville, Ky., assignor to Corning Glass Works, Corning, N. Y., a corporation of New York Application February 24, 1949, Serial No. 78,133

7 Claims. (Cl. 106—55)

This invention relates to dense, non-porous stannic oxide refractory compositions characterized by a decrease in electrical resistance with an increase in temperature whereby they are particularly suitable for use as electrodes in the electric melting of glass.

Electrodes for such purposes extend through the wall of the glassmelting container and are subjected during use to temperatures ranging from glassmelting temperatures within the container to external temperatures of 500° C. and less. The external portion of such an electrode is connected with a suitable source of electric power; and in order to permit the passage of sufficient electric current for melting glass, the electrode must have a relatively low electrical resistance at 500° C. or less.

In my copending application Serial No. 564,689, filed November 22, 1944, now Patent No. 2,467,144, of which this application is a continuation-in-part, there are disclosed electrically conducting stannic oxide refractory compositions suitable for this purpose. As shown in that application, stannic oxide possesses an appreciable electrical conductivity in the neighborhood of 1200° C. and above. The addition of 0.5% to 2% of uranium ovide to stannic oxide serves to materially increase the electrical conductivity thereof, not only at high temperatures, but also at temperatures in the neighborhood of 500° C. and below. The electrical resistance of stannic oxide refractories can thereby be lowered sufficiently to make them suitable for use as electrodes in the electric melting of glass. Preferably, the stannic oxide refractory composition also contains 0.5% to 2% of a shrinking agent which is incorporated therein to facilitate its firing shrinkage in accordance with the teaching in Hood 2,244,777, and which advantageously consists of an oxide of nickel, cobalt, iron, manganese, copper, silver, gold, or zinc.

While such refractory bodies are generally satisfactory, stannic oxide refractories having still greater electrical conductivity would nevertheless be advantageous and desirable in many instances.

I have now discovered that the introduction of 0.2% to 5% of an oxide of antimony or bismuth into the stannic oxide refractory compositions disclosed in my copending application causes a still further and material decrease in their electrical resistance, particularly at the lower temperatures encountered at the external end of glassmelting electrodes. My present discovery finds its most advantageous use with those compositions including a shrinking agent, and the present compositions preferably comprise 91% to 98.5% stannic oxide, 0.5% to 2% uranium oxide, 0.5% to 5% antimony oxide or bismuth oxide, and 0.5% to 2% of a shrinking agent consisting of an oxide of nickel, cobalt, iron, manganese, copper, silver, gold, or zinc.

As indicated in my copending application, at least 0.5% of uranium oxide is necessary to effect a significant lowering of the electrical resistance of a stannic oxide refractory. In the present instance I have found that similarly at least 0.5% of uranium oxide should be present, and that at least 0.5% of antimony oxide or bismuth oxide must also be present in order to obtain an effective lowering of the electrical resistance of the stannic oxide. Amounts in excess of 2% of uranium oxide and 5% of antimony oxide or bismuth oxide produce no material increase in the electrical conductivity of the stannic oxide refractory and, moreover, tend to objectionably decrease the refractoriness of the present composition.

As with the stannic oxide compositions described in my copending application, the combined effect of the uranium oxide and the antimony oxide or bismuth oxide in lowering the electrical resistance of a stannic oxide refractory is materially increased by the inclusion of one of the indicated shrinking agents in the present composition. At least 0.5% of the shrinking agent, as taught in Hood 2,244,777, should be employed in order to obtain the desired shrinkage of the stannic oxide in a minimum amount of time. No additional benefit is obtained with amounts of the shrinking agent greater than about 2%, although no particular harm arises from the use of somewhat larger amounts. Of the indicated shrinking agents, cupric oxide is more effective than the others, and is preferred.

The present refractory compositions may be compounded, shaped, and fired in any known manner as, for example, in accordance with the procedures described in detail in the Hood patent. Particularly good results are obtained by forming a slip of the batch for the refractory composition and casting it in the usual manner. To prevent the formation of drying cracks prior to sintering or firing, and to minimize firing shrinkage, it is preferable to employ in the batch upwards of 50% of a grog prepared by prefiring a portion of the batch and grinding it to the desired fineness.

As with the uranium oxide and the shrinking agent described in my copending application, the antimony oxide and bismuth oxide may be introduced into the batch for the present composition in the form of various water-insoluble or water-soluble compounds, such as the oxides, the silicates, the nitrates, the sulphates, the halides, and the like. Preferably, the oxides are used, and they may be employed in whatever state of oxidation they are available. It is believed that the batch components, if not already present as the oxides, are converted thereto when the composition is fired.

In what state of oxidation the uranium oxide and antimony oxide or bismuth oxide are present in the fired composition is not definitely known. For convenience, however, I have computed and expressed these oxides in their lower state of oxidation; namely, as $UO_2$ and $Sb_2O_3$ or $Bi_2O_3$.

The following compositions, in approximate percentages by weight as calculated from their batches, have been found particularly suitable, and are illustrative of the preferred embodiment of my invention.

|         | A    | B    |
|---------|------|------|
| $SnO_2$ | 97   | 97.5 |
| $CuO$   | 1    | 0.5  |
| $UO_2$  | 1    | 1    |
| $Sb_2O_3$ | 1  |      |
| $Bi_2O_3$ |    | 1    |

For comparison of the electrical resistance of the compositions of this invention with those of my copending application referred to above, reference is had to the accompanying drawing which shows a series of curves representing change in electrical resistivity with change in temperature. The rate of change in electrical resistivity is relatively large and its values are plotted on a logarithmic scale for better presentation. Curve X, which is identical with curve 2 of my copending application, represents the resistivity versus temperature of a composition consisting approximately of 96% $SnO_2$, 2% $CuO$, and 2% $UO_2$. Curves A and B represent corresponding values for compositions A and B respectively, of the above table. It will be noted that the electrical resistivities of compositions A and B are substantially lower throughout the entire indicated temperature range than that of the prior composition.

I claim:

1. A sintered refractory body characterized by a decrease in electrical resistance with an increase in temperature, and comprising 91% to 98.5% $SnO_2$, 0.5% to 2% $UO_2$, 0.5% to 5% of an oxide selected from the group consisting of $Sb_2O_3$ and $Bi_2O_3$, and 0.5% to 2% of an oxide selected from the group consisting of the oxides of nickel, cobalt, iron, manganese, copper, silver, gold, and zinc.

2. A sintered refractory body characterized by a decrease in electrical resistance with an increase in temperature, and comprising 91% to 98.5% $SnO_2$, 0.5% to 2% $UO_2$, 0.5% to 5% of an oxide selected from the group consisting of $Sb_2O_3$ and $Bi_2O_3$, and 0.5% to 2% $CuO$.

3. A sintered refractory body characterized by a decrease in electrical resistance with an increase in temperature, and comprising 91% to 98.5% $SnO_2$, 0.5% to 2% $UO_2$, 0.5% to 5% $Sb_2O_3$, and 0.5% to 2% of an oxide selected from the group consisting of the oxides of nickel, cobalt, iron, manganese, copper, silver, gold, and zinc.

4. A sintered refractory body characterized by a decrease in electrical resistance with an increase in temperature, and comprising 91% to 98.5% $SnO_2$, 0.5% to 2% $UO_2$, 0.5% to 5% $Bi_2O_3$, and 0.5% to 2% of an oxide selected from the group consisting of the oxides of nickel, cobalt, iron, manganese, copper, silver, gold, and zinc.

5. A sintered refractory body characterized by a decrease in electrical resistance with an increase in temperature, and comprising 91% to 98.5% $SnO_2$, 0.5% to 2% $UO_2$, 0.5% to 5% $Sb_2O_3$, and 0.5% to 2% $CuO$.

6. A sintered refractory body characterized by a decrease in electrical resistance with an increase in temperature, and consisting approximately of 97% $SnO_2$, 1% $UO_2$, 1% $Sb_2O_3$, and 1% $CuO$.

7. A sintered refractory body characterized by a decrease in electrical resistance with an increase in temperature, and consisting approximately of 97.5% $SnO_2$, 1% $UO_2$, 1% $Bi_2O_3$, and 0.5% $CuO$.

JOHN M. MOCHEL.

No references cited.